(12) United States Patent
Finestone et al.

(10) Patent No.: US 6,797,395 B2
(45) Date of Patent: Sep. 28, 2004

(54) PAPER-PLASTIC LAMINATE SHEETING

(75) Inventors: Arnold B. Finestone, West Palm Beach, FL (US); Gilbert Bloch, Palm Beach Gardens, FL (US)

(73) Assignee: Tru-Tech Group, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/680,074

(22) Filed: Oct. 6, 2003

(65) Prior Publication Data

US 2004/0105993 A1 Jun. 3, 2004

Related U.S. Application Data

(60) Continuation of application No. 10/167,268, filed on Jun. 10, 2002, now Pat. No. 6,652,984, which is a division of application No. 09/781,181, filed on Feb. 12, 2001, now Pat. No. 6,706,388, which is a continuation of application No. 09/258,766, filed on Feb. 26, 1999, now Pat. No. 6,235,386, which is a continuation of application No. 08/209,405, filed on Mar. 14, 1994, now Pat. No. 5,962,099, which is a continuation of application No. 08/057,963, filed on May 4, 1993, now abandoned, which is a division of application No. 07/818,544, filed on Jan. 9, 1992, now Pat. No. 5,244,702.

(51) Int. Cl.$^7$ .............................. C09J 5/00; B32B 27/00

(52) U.S. Cl. ...................... 428/480; 428/481; 428/483; 428/507; 428/511; 428/512; 428/513; 428/514; 428/537.5; 428/910; 156/332; 156/334

(58) Field of Search ................................. 428/480, 481, 428/483, 507, 511, 512, 513, 514, 537.5, 910; 156/332, 334

(56) References Cited

U.S. PATENT DOCUMENTS

| | | | |
|---|---|---|---|
| 3,669,822 A | 6/1972 | Cowen | 161/130 |
| 4,254,173 A | 3/1981 | Peer, Jr. | 428/204 |
| 4,680,918 A | 7/1987 | Lovell | 53/466 |
| 4,865,908 A | 9/1989 | Liu et al. | 428/248 |
| 4,900,594 A | 2/1990 | Quick et al. | 428/34.2 |
| 5,037,700 A | 6/1991 | Davis | 428/414 |
| 5,244,702 A | 9/1993 | Finestone et al. | 428/34.3 |
| 5,518,799 A | 5/1996 | Finestone et al. | 428/137 |
| 5,565,252 A * | 10/1996 | Finestone et al. | 428/40.9 |
| 5,595,046 A | 1/1997 | Weder | 53/397 |
| 5,655,707 A | 8/1997 | Jensen | 229/160.2 |
| 5,704,481 A | 1/1998 | Lutz | 206/484 |
| 5,780,150 A | 7/1998 | Bloch et al. | 428/350 |
| 5,786,064 A | 7/1998 | Finestone et al. | 428/137 |

(List continued on next page.)

FOREIGN PATENT DOCUMENTS

| | | |
|---|---|---|
| EP | 0 011 274 A1 | 5/1980 |
| EP | 0 056 452 A2 | 7/1982 |

OTHER PUBLICATIONS

G. Allen, Comprehensive Polymer Science, Pergamon Press, vol. 1, p. 775 (1989).

(List continued on next page.)

*Primary Examiner*—Monique R. Jackson
(74) *Attorney, Agent, or Firm*—Winston & Strawn LLP

(57) ABSTRACT

A paper-plastic laminate sheeting capable of being converted by conventional equipment into envelopes, grocery bags and other dilatable container products that initially are in a flat state and are normally made of paper. The sheeting is composed of a paper facing sheet cold-laminated by means of a water-based adhesive to a reinforcing film of synthetic plastic material, such as polypropylene. The film is oriented to impart exceptional tear and burst strength characteristics to the resultant waterproof product. The product, whose exterior surface is formed by the paper facing sheet, is readily printable. For some applications, a second paper facing sheet is cold-laminated to the other side of the film to produce a three-ply laminate sheeting whose exposed surfaces are readily printable and can accept conventional adhesives.

28 Claims, 1 Drawing Sheet

U.S. PATENT DOCUMENTS

| | | | | |
|---|---|---|---|---|
| 5,962,099 | A | 10/1999 | Bloch et al. | 428/41.4 |
| 6,076,969 | A | 6/2000 | Jaisle et al. | 383/211 |
| 6,085,904 | A | 7/2000 | Perdue, Jr. | 206/484 |
| 6,115,999 | A | 9/2000 | Adelman | 53/465 |
| 6,133,173 | A | 10/2000 | Riedel et al. | 442/400 |
| 6,135,506 | A | 10/2000 | Chess et al. | 283/80 |
| 6,235,386 | B1 | 5/2001 | Bloch et al. | 428/345 |
| 6,436,499 | B1 | 8/2002 | Krampe et al. | 428/40.1 |
| 6,652,984 | B2 * | 11/2003 | Finestone et al. | 428/480 |

OTHER PUBLICATIONS

D.J. Bentley, Jr., "Laminating With Waterborne Adhesives", Paper, Film & Foil Converter, pp. 42–43 (1985).

R.J. Isbister et al., "High Performance Water Borne Laminating Adhesives", Paper Synthetics Conference, Atlanta, GA, pp. 121–124 (1982).

L. Mushel, "Laminating", Web Processing and Converting Technology and Equipment, Van Nostrand Reinhold Company, pp. 224–240 (1984).

P.B. Sherman, "Adhesion and Corona Treatment," SPE Natl. Tech. Conf., Chicago, IL, pp. 184–189A (1978).

Ullmanns Encyklopädie der technischen Chemie, Verlag Chemie, Weinheim/Bergstr., Band 11, pp. 676–683 (1976) (with English translation).

Decision dated Dec. 22, 2003 dismissing opposition against the granting of corresponding European patent 619,181 including minutes of Oral Hearing.

* cited by examiner

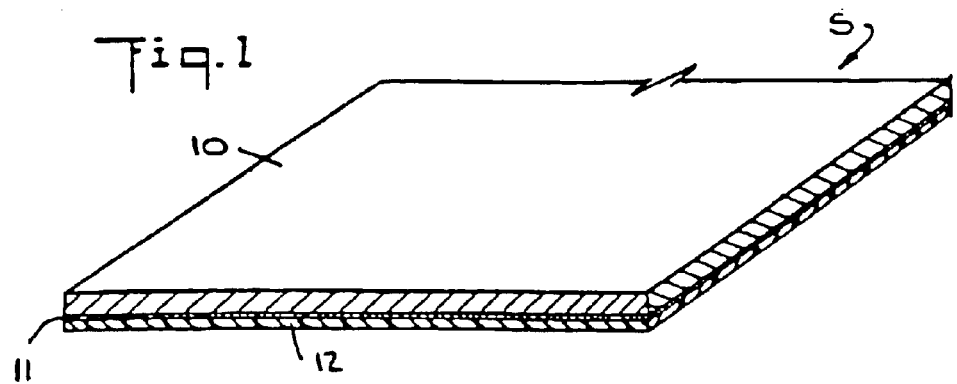
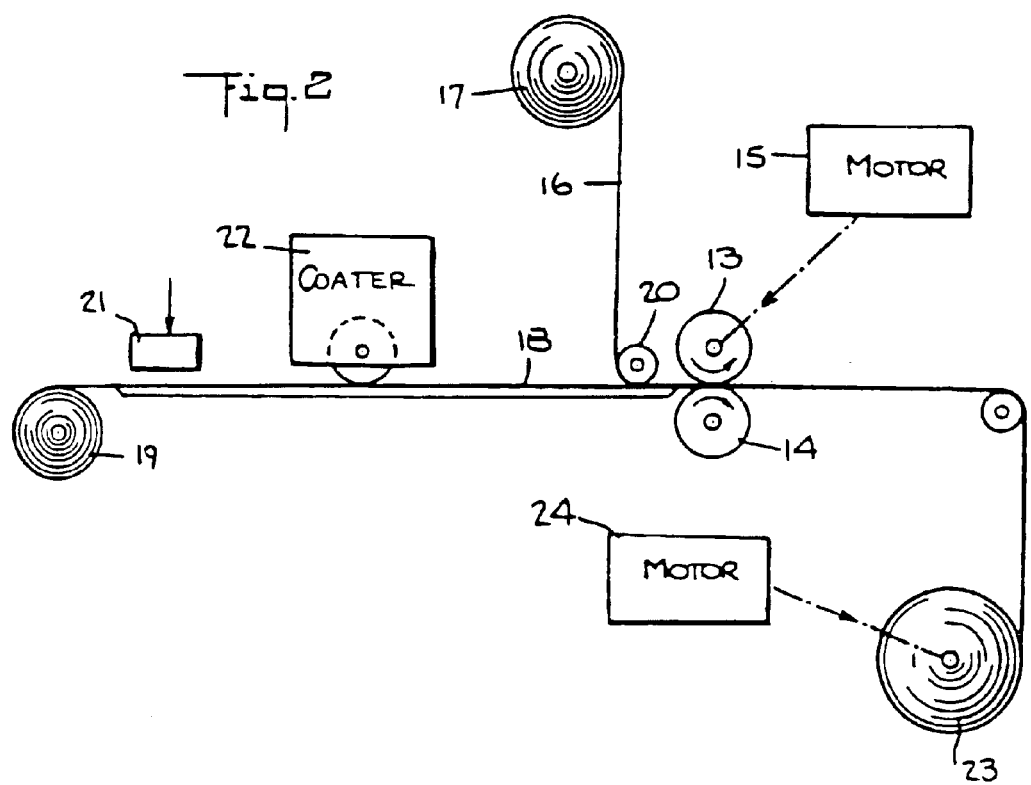

PAPER-PLASTIC LAMINATE SHEETING

CROSS-REFERENCE TO RELATED APPLICATIONS

This application is a continuation of application Ser. No. 10/167,268 filed Jun. 10, 2002, now U.S. Pat. No. 6,652,984, which is a division of application Ser. No. 09/781,181 filed Feb. 12, 2001, now U.S. Pat. No. 6,706,388, which is a continuation of application Ser. No. 09/258,766, filed Feb. 26, 1999, now U.S. Pat. No. 6,235,386, which is a continuation of application Ser. No. 08/209,405 filed Mar. 14, 1994, now U.S. Pat. No. 5,962,099, which is a continuation of application Ser. No. 08/057,963 filed May 4, 1993, now abandoned, which is a division of application Ser. No. 07/818,544 filed Jan. 9, 1992, now U.S. Pat. No. 5,244,702.

BACKGROUND OF INVENTION

1. Field of Invention

This invention relates to paper-plastic and paper-plastic-paper laminates in the form of sheeting which is capable of being converted into a self-closing package or other material such as envelopes, bags and other dilatable container products which initially are in a flat state and are normally made of paper. In these laminates, a paper facing sheet is cold-laminated to an oriented film of synthetic plastic material, or two paper sheets are cold laminated to the film.

2. Status of Prior Art

The sheeting traditionally used in making envelopes, grocery bags and other types of dilatable container products which initially are in a flat state is paper. Paper is a semi-synthetic material made by chemically processing cellulose fibers.

Apart from its low cost, an important advantage of paper is that it can be converted into envelopes and other types of dilatable container products by means of high speed equipment that functions to cut and fold the sheeting into the desired configuration, the folds and flaps of the product being bonded together, where necessary, by standard low-cost adhesives. Another advantage of paper in this context is that it can readily be printed and colored, using standard inks for this purpose.

But such paper products suffer from several disadvantages, for they are characterized by low tear and burst strength, and are by no means water resistant; for unless coated, paper is highly absorbent.

Also well known in the art are plastic-coated cellulosic papers, these being used chiefly in children's books, posters, signs and shipping tags, and for other purposes demanding resistance to hard wear and to outdoor exposure. However, such plastic-coated papers lack high tear and burst strength. Also low in strength are special purpose coated papers covered on one or both sides with a suspension of clays, starches, rosin or wax, or a combination of these substances.

To overcome the drawbacks of paper-fabricated dilatable container products, in recent years such products have been made of TYVEC or other polymeric synthetic plastic sheeting. The resultant products not only have a tear and bursting strength far superior to paper, but they are also waterproof.

However, TYVEC and similar synthetic plastic sheeting is difficult to convert into envelopes and other dilatable container products using high-speed equipment of the type mainly suitable for paper. As a consequence, production scrap rates can run as high as thirty percent, thereby raising the cost of manufacturing these products. Moreover, such plastic sheeting has a low chemical affinity for standard adhesives; hence in the case of envelopes, one must then use a special and more costly adhesive on the flaps. And such plastic sheeting also has a low affinity for standard printing inks, and the products, therefore, demand special printing inks for this purpose.

SUMMARY OF THE INVENTION

The invention relates to a flexible paper-plastic laminate sheeting capable of being converted by conventional equipment into envelopes, bags and other dilatable container products normally made of paper which initially are in a flat state. The laminate sheeting comprises:

(a) a first paper facing sheet having first and second surfaces; and (b) a reinforcing film of a synthetic oriented polymer comprising polyethylene or polypropylene, the film having a first and second surfaces, one of which is treated to increase its dynes and its affinity to adhesives, the treated surface of the film being cold-laminated by a water-based adhesive to the first surface of the paper facing sheet whereby products made from the sheeting have a printable paper exterior and exceptional tear and burst strength.

In a preferred embodiment, a second paper facing sheet having first and second surfaces is cold-laminated by a water-based adhesive to the first surface of the second paper facing sheet to produce a non-curling, three-ply laminate sheeting having exterior surfaces of the first and second printable paper sheets.

To facilitate this, the second surface of the reinforcing film is treated to increase its dynes and its affinity to adhesives. In the three ply embodiment, the reinforcing film can instead be polyester.

The invention also relates to a method of making a flexible paper-plastic laminate sheeting capable of being converted by conventional equipment into envelopes, bags and other dilatable container products normally made of paper which initially are in a flat state. This method comprises providing a supply of a first paper sheet having first and second surfaces; providing a supply of a reinforcing film of a synthetic plastic material having first and second surfaces; orienting the film of plastic material to increase its strength; treating the first surface of the film to increase its dynes and its affinity to adhesives; applying a water-based adhesive to the treated first surface of the film; and cold-laminating the adhesive bearing first film surface to the first surface of the paper sheet to form a laminate sheeting that has a paper surface and exceptional tear and burst strength.

Another embodiment of this method further comprises providing a supply of a second paper sheet having first and second surfaces; treating the second surface of the film to increase its dynes and its affinity to adhesives; applying a water-based adhesive to the treated second surface of the film; and cold-laminating the adhesive bearing second film surface to the first surface of the second paper sheet to form a non-curling, three-ply laminate sheeting that has outer printable paper surfaces and exceptional tear and burst strength.

BRIEF DESCRIPTION OF DRAWINGS

For a better understanding of the invention as well as other objects and further features thereof, reference is made to the following detailed description to be read in conjunction with the accompanying drawings, wherein:

FIG. 1 illustrates a flexible, paper-plastic laminate sheeting in accordance with the invention; and FIG. 2 shows, in schematic form, a system adapted to produce the sheeting.

DETAILED DESCRIPTION OF THE PREFERRED EMBODIMENTS

The invention now provides a paper-plastic laminate sheeting capable of being converted by conventional equipment of the type heretofore used with paper, into envelopes, grocery bags and other types of dilatable container products which initially are in a flat state.

This invention provides a sheeting of the above type in which a facing paper sheet is cold-laminated to a reinforcing film of synthetic oriented plastic material, whereby the properties of the oriented film are unimpaired and provide exceptional tear and burst characteristics.

Among the salient advantages of paper-plastic laminate sheeting in accordance with the invention are the following:

A. The laminate is waterproof.
B. The paper facing of the laminate sheeting has a high affinity for standard printing inks, and can readily be printed and colored.
C. A standard starch or pressure-sensitive adhesive may be used on the paper surfaces of the laminate sheeting.
D. The laminate sheeting can be converted into other products by conventional equipment for this purpose with minimum scrap in a range in a range comparable to the scrap rate encountered in making paper envelopes and other dilatable container products.

Also, the invention provides a system for carrying out at high speed a preferred technique for producing this laminate sheeting.

The laminate sheeting is composed of a paper facing sheet that is cold-laminated by means of a water-based adhesive to a reinforcing film of synthetic plastic material, such as polyethylene, polypropylene or polyester. The film is oriented to impart exceptional tear and burst strength characteristics to the resultant waterproof product. The product, whose exterior surface is formed by the paper facing sheet, is readily printable.

For some applications, a paper facing sheet is cold-laminated to the other side of the film to produce a three-ply laminate sheeting whose exposed paper surfaces are readily printable and can accept conventional adhesives.

The paper layer of the packaging material preferably comprises Kraft paper and has a thickness of from about 3 to about 6 mils. The plastic film layer may be oriented to impart high strength thereto. A biaxial orientation is preferred for greatest strength. The plastic film layer preferably comprises a polymer selected from the group consisting of polypropylene, polyethylene and polyester and has a thickness of from at least about 0.5 to 3 mils.

The plastic film layer has a first corona-discharge treated surface. This treatment is applied to the plastic immediately before the first corona discharge treated surface is adhesively laminated to the paper layer. This enables a strong bond to be achieved between the plastic and paper to form a paper-plastic film laminate having opposed outer surfaces, one of which is paper and the other of which is plastic.

The cold lamination process enables the present laminate sheeting to be manufactured at much higher speeds than when other adhesives, such as hot melt adhesives, are utilized, for example due to the additional time required for cooling of the hot melt adhesive before a secure bond is achieved. If hot melt adhesives were used instead of cold lamination for joining the plastic film to the paper, the heat of the adhesive could cause the film to shrink, thus causing a loss of strength. Also, the hot melt adhesive does not achieve its final bond strength until the adhesive cools, and the plastic film can shrink before this happens. Moreover, a wrinkled or curled product often results due to the difference in the high strength and low strength areas of the plastic film.

The use of cold lamination is also advantageous when an oriented or biaxially-oriented plastic film is utilized. It is known that at elevated temperatures, such films relax and lose molecular orientation and strength. For example, when two sheets of biaxially-oriented polyester film are seamed together, using an ultrasonically-activated sealing bar to create internal friction and heat within the film, the films soften and fuse, with a resultant sealing line that is weak, such that the sheets then tend to tear along this line. Similar problems are encountered if an oriented film is exposed to high heat, such as if a hot melt adhesive would be used to join the film to the paper. Cold lamination utilizing a water-based adhesive is essential in order to produce a laminate that has high strength. Any of a wide range or water-based adhesives can be used. The paper layer absorbs the water from adhesives so that a high strength lamination can be rapidly achieved.

Another benefit of the use of a water based adhesive is that this type of adhesive does not require the use of volatile organic solvents. Thus, adverse health and environmental effects are avoided because such solvents are not used. Also, additional costs for recovering or disposing of solvents are not incurred.

Referring now to FIG. 1, shown therein in an enlarged scale is a flexible paper-plastic sheeting S in accordance with the invention. Sheeting S includes a paper facing sheet 10 whose gauge, weight and quality are appropriate to the end use for which the sheeting is intended. Thus the paper sheet may be of good quality, unbleached Kraft paper.

Cold-laminated by an adhesive layer 11 to the undersurface of paper facing sheet 10 is a reinforcing film 12 of synthetic plastic material which is preferably transparent and is uniaxially or biaxially-oriented. Film materials suitable for this purpose are polypropylene, polyethylene, or a polyester such as MYLAR.

The tensile strength of a synthetic plastic film is substantially increased by orientation which results in molecular orientation of the film. In the case of biaxial orientation, orientation is in both the longitudinal and transverse directions. This is usually effected by controlled stretching of the unoriented film.

The tensile strength of an oriented film is seriously impaired if heat is applied thereto, for the heat acts to relax the film and cause it to lose its molecular orientation. Thus when biaxially oriented Mylar film panels are superposed and sealed together by heat and pressure applied along a line running along the panels, the film may then be easily torn along this line.

This is the reason why in the present invention the use of hot melt adhesives to laminate a reinforcing film to the undersurface of the paper sheet is interdicted; for to do so would seriously diminish the reinforcing characteristics of the film.

In the present invention, the plastic film is cold laminated to the paper sheet under pressure and at room temperature by means of a water-based polyacrylate copolymer adhesive or by any other water-based adhesive having similar bonding properties and having an affinity both for the paper sheet and the plastic film. Preferably, a water based adhesive of a vinyl acetate ethylene copolymer is preferred.

Since paper tends to absorb water in the laminating process, before the paper sheet and the film are together fed into pressure rolls and subjected to pressure to effect lamination, the first surface of the film is first coated with the water-based adhesive which does not encounter the first surface of the paper sheet until these two surfaces meet in the pressure rolls. In this way, the period during which absorption of the adhesive into the interior of the paper sheet can take place is limited.

And to render the first surface of the film more receptive to the water-based adhesive applied thereto, it is preferably first subjected to ionization to enhance the dynes on this surface.

FIG. 2 shows a system for carrying out a preferred technique for effecting cold lamination of the paper sheet and a plastic oriented reinforcing film to produce a two-ply laminate sheeting.

The system includes a combining station having a pair of cooperating pressure rolls 13 and 14 driven at high speed by a motor 15. The nip between the rolls is related to the thickness of the webs to be laminated and is adjusted to provide the required degree of laminating pressure to ensure secure bonding of the webs. Fed concurrently into the nip of the pressure rolls is a web of paper 16 drawn from a supply reel 17, and a web of film 18 drawn from a supply reel 19.

Reel 17 is supported at an elevated position, web 16 being drawn down from this reel in a vertical path and being guided by an idler roll 20 into a horizontal path leading to the combining station. Film supply reel 19 is supported at a position to feed the film in a horizontal path toward the combining station, reel 19 being placed well in advance of this station to expose a stretch of film web 18 before it enters the nip of the combining rolls.

Along the stretch just above web 18 is an ionization bar 21 which functions to ionize the first surface of film web 18 to increase the dynes of the surface preparatory to the application of a water-based adhesive thereto. Then applied onto the first surface of film web 18 by means of an adhesive applicator 22 is a coating of water-based adhesive. It is not essential that the coating fully cover this surface, for in practice the roll of the adhesive applicator may take the form of a series of rings to apply parallel strips of adhesive to the film surface.

Hence when the adhesive-coated film web and paper web 16 together enter the combining station and are subjected to pressure by pressure rolls 13 and 14, lamination is effected by this action. The laminated webs are then wound on an output reel 23 driven by a motor 24. The operation of motors 15 and 24 are synchronized; for these motors function to draw the webs from the supply reels.

In practice, the system may be driven by the motor to operate at a speed of 150 to 500 feet per minute, or at an even greater rate. The operating speed is limited by the strength of the paper web, for with a relatively thin paper web of low strength, the speed must be such as not to rupture the paper web. Hence while the oriented film can tolerate high speeds, the speed cannot exceed that which can be tolerated by the paper web.

The two-ply paper-plastic laminate sheeting wound on output reel 23 may now be used in exactly the same manner as a reel of ordinary paper as the stock roll for standard equipment adapted to fabricate envelopes, bags or other dilatable paper products, by slitting, folding and whatever other operations are dictated by the form of the product.

In some applications, a three-ply paper-plastic-paper laminate sheeting may be desirable. In this laminate, paper sheets are cold-laminated to the opposite sides of the oriented plastic reinforcing film. The film, which is then sandwiched between the paper sheets, serves to impart exceptional high-strength physical properties to the laminate.

In practice, a three-ply laminate can be produced in a two-stage system; the first stage being a laminate of the type shown in FIG. 2 in which a paper web is cold-laminated to one side of a film web to produce a two-ply sheeting wound on output roll 23. In the second stage, a like laminate is used, but in this stage, a two-ply web drawn from roll 23 is then cold-laminated on its exposed film side to a web of paper drawn from a paper so that wound on the output roll of the second laminate is the three-ply laminate sheeting.

A problem encountered with two-ply paper-film laminate sheeting is that this sheeting tends to curl because of the dissimilar properties of the plies. Such curling is not desirable in products such as envelopes, though it may not be objectionable in other products. But when, however, the oriented film ply is sandwiched between two like plies of paper, the resultant symmetry avoids the problem of curling.

The three-ply laminate sheeting has another important advantage, for now both exposed surfaces are paper. This makes it possible when the three-ply laminate sheeting is being converted in standard equipment for this purpose into an envelope or grocery bag in which the sheeting is slit and folded to form flaps or other elements which must be sealed together, to use conventional, commercially available adhesives for this purpose, rather than the special adhesives that would be dictated if the surfaces to be sealed together included a plastic film surface. And because all exposed surfaces of the three-ply sheeting are paper, they can be readily printed.

While there have been shown and described preferred embodiments of a paper-plastic laminate sheeting in accordance with the invention, it will be appreciated that many changes and modifications may be made therein without, however, departing from the essential spirit thereof.

What is claimed is:

1. A flexible paper-plastic laminate sheeting comprising at least one paper sheet, a reinforcing film of a synthetic oriented polymer that has at least one surface treated to increase its dynes and make it receptive to adhesives, wherein the film is laminated to at least one of the paper sheets by a water-based adhesive that contacts the treated surface of the film and has its water absorbed by the paper sheet to effect lamination thereof.

2. The laminate sheeting of claim 1 wherein the film has undergone molecular orientation to increase its strength prior to lamination, and the surface of the film is treated by ionization using corona discharge.

3. The laminate sheeting of claim 1 wherein the film is biaxially oriented.

4. The laminate sheeting of claim 1 wherein the film is polypropylene, polyethylene, or polyester.

5. The laminate sheeting of claim 1 wherein the water-based adhesive is a polyacrylate or vinyl acetate ethylene copolymer.

6. The laminate sheeting of claim 1 wherein the paper facing sheet is formed of Kraft paper.

7. A flexible paper-plastic laminate sheeting comprising first and second paper sheets, a reinforcing film of a synthetic oriented polymer that has first and second surfaces treated to increase its dynes and make it receptive to adhesives, wherein the film is laminated to both paper sheets by a water-based adhesive that contacts each treated surface of the film and has its water absorbed by the respective first and second paper sheets to effect lamination thereof.

8. The laminate sheeting of claim 7 wherein the film has undergone molecular orientation to increase its strength prior to lamination, and the surface of the film is treated by ionization using corona discharge.

9. The laminate sheeting of claim 7 wherein the film is biaxially oriented.

10. The laminate sheeting of claim 7 wherein the film is polypropylene, polyethylene, or polyester.

11. The laminate sheeting of claim 7 wherein the water-based adhesive is a polyacrylate or vinyl acetate ethylene copolymer.

12. The laminate sheeting of claim 7 wherein the paper facing sheet is formed of Kraft paper.

13. A method of making a flexible paper-plastic laminate sheeting comprising: providing a supply of a first paper sheet having first and second surfaces; providing a supply of a reinforcing film of a synthetic oriented polymer material having first and second surfaces; treating the first surface of the film to increase its dynes and its affinity to adhesives; applying a water-based adhesive to the treated first surface of the film; and cold-laminating the adhesive bearing first film surface to the first surface of the paper sheet the film such that the water of the adhesive is absorbed by the paper sheet to effect lamination thereof and form a product that has a paper surface and resistance against tearing and bursting.

14. The method of claim 13, which further comprises: providing a supply of a second paper sheet having first and second surfaces; treating the second surface of the film to increase its dynes and its affinity to adhesives; applying a water-based adhesive to the treated second surface of the film; and cold-laminating the adhesive bearing second film surface to the first surface of the second paper sheet such that the water of the adhesive is absorbed by the paper sheet to effect lamination thereof and form a non-curling, three-ply laminate sheeting product that has outer printable paper surfaces and resistance against tearing and bursting.

15. The method of claim 14, wherein the film has undergone molecular orientation to increase its strength prior to lamination, and the treated first and second surfaces are achieved by ionization using corona discharge.

16. The method of claim 15, wherein the film is biaxially oriented.

17. The method of claim 15, wherein the orientation of the film is unchanged after cold laminating.

18. The method of claim 13, wherein the film is polypropylene, polyethylene or polyester.

19. The method of claim 13, wherein the water-based adhesive comprises a polyacrylate or vinyl acetate ethylene copolymer and the paper facing sheet is formed of Kraft paper.

20. The method of claim 14, wherein each water-based adhesive comprises a polyacrylate or vinyl acetate ethylene copolymer and the paper facing sheet is formed of Kraft paper.

21. The method of claim 13, wherein the laminate sheeting is produced at a speed of 150 to 500 feet per minute or greater.

22. The method of claim 13, wherein the laminate sheeting is produced at a higher speed than a paper-plastic laminate sheeting made using a hot melt adhesive.

23. The method of claim 13, wherein adverse health and environmental effects are avoided since no organic solvents are present in the adhesive or are used during cold laminating.

24. The method of claim 13, wherein the laminate sheeting is made without producing high and low strength areas of the film in order to avoid curling or wrinkling.

25. The method of claim 13, wherein the laminate sheeting is made without exposing the oriented polymer film to elevated temperatures that would cause the film to relax and lose orientation or strength.

26. A flexible paper-plastic laminate sheeting comprising, in combination, at least one paper facing sheet laminated to at least one reinforcing film of a synthetic oriented polymer using a water-based adhesive that does not contain volatile organic solvents and that does not require the addition of curing agents or catalysts to promote curing of the adhesive, and the surface of the film that is laminated to the paper facing sheet is treated by ionization to enhance its affinity for the water-based adhesive, whereby products made from the sheeting have a printable paper exterior.

27. The laminate sheeting of claim 26 wherein the film is biaxially oriented.

28. The laminate sheeting of claim 27 wherein the water-based adhesive is a polyacrylate or vinyl acetate ethylene copolymer.

* * * * *